US005433030A

United States Patent [19]
Lehman

[11] Patent Number: 5,433,030
[45] Date of Patent: Jul. 18, 1995

[54] PLANT PROTECTOR

[76] Inventor: John E. Lehman, 4017 Greenbriar, Dallas, Tex. 75225

[21] Appl. No.: 223,634

[22] Filed: Apr. 6, 1994

[51] Int. Cl.⁶ ............................................. A01G 9/00
[52] U.S. Cl. ........................................ 47/32.1; 47/17
[58] Field of Search .................... 47/32.1, 17; 52/2.17, 52/2.18, 2.22, 2.23

[56] References Cited

U.S. PATENT DOCUMENTS

| | | | |
|---|---|---|---|
| 3,086,753 | 4/1963 | Cushman | 52/2.22 |
| 3,206,892 | 9/1965 | Telkes et al. | 47/32.1 |
| 4,012,867 | 3/1977 | Lainchbury et al. | 52/2.17 |
| 4,304,068 | 12/1981 | Beder | 47/32.1 |
| 4,833,813 | 5/1989 | McLemore, Jr. | 52/2.22 |
| 5,007,212 | 4/1991 | Fritts et al. | 52/2.18 |

FOREIGN PATENT DOCUMENTS

| | | | |
|---|---|---|---|
| 755885 | 4/1967 | Canada | 52/2.18 |
| 811479 | 4/1969 | Canada | 52/2.23 |
| 1282385 | 12/1961 | France | 52/2.22 |
| 2035077 | 6/1972 | Germany | 52/2.18 |
| 440584 | 12/1967 | Switzerland | 52/2.23 |
| 0623469 | 6/1981 | Switzerland | 52/2.22 |

*Primary Examiner*—Ramon S. Britts
*Assistant Examiner*—Joanne C. Downs
*Attorney, Agent, or Firm*—Crutsinger, Booth & Kanz

[57] ABSTRACT

A portable self-supporting greenhouse comprising: a plurality of transparent inflatable tubular rings forming a cylindrical shaped structure, the tubular rings having a first inlet for inflating the transparent tubular rings and interconnecting passageways which allow the transparent rings to be inflated via the first inlet, at least one opaque inflatable tubular ring attached to the transparent inflatable rings forming a base for the structure, the opaque ring having a second inlet for inflating the opaque ring with a dense medium. A transparent cover is provided which comprises a plurality of transparent inflatable radial segments defining an annular top which is in communication with the transparent rings, the annular top having an opening and an inflatable transparent hatch positioned over the opening and removably secured to the annular top. In addition, a doorway and a door are provided in the cylindrical structure, the door comprises a plurality of inflatable tubular ring sections in communication with the transparent tubular rings forming the cylindrical structure. The door has a hinge and a latch to secure the door in a closed position. The doorway includes a frame of inflatable tubular columns in air communication with the transparent tubular rings.

12 Claims, 2 Drawing Sheets

PLANT PROTECTOR

FIELD OF INVENTION

The present invention relates to protective covers for plants, such as greenhouses, for protecting vegetation from extreme weather conditions.

BACKGROUND OF INVENTION

Indigenous plants generally require no special attention. By definition they are plants which are native to the area and are suited for the environment in which they live. However, many gardeners desire to landscape with non-native plants because of their appearance or the fruit that they bear or the attractive flowers or blossoms that they produce. Despite attempts to climatize these desired plants through hybridization, many plants still have a limited tolerance for extreme temperatures and excessively dry or moist conditions. Thus, many of these non-native plants need an environment in which these factors can be controlled.

Non-native plants and other exotic plants can be grown in traditional greenhouses. However, greenhouses are relatively expensive to buy and occupy a large space in the yard. In addition, greenhouses require construction and assembly. More significantly to the gardener, if the plants are chosen for their decorative effect, for instance azaleas and gardenias, then growing them in greenhouses would defeat this purpose.

U.S. Pat. No. 2,835,078 discloses a protective cover for perishable crops which includes a canopy of flexible, light transparent, moisture-proof material. The canopy is formed by stacking generally cylindrical members having progressively smaller upper and lower diameters one above the other and closing an upper opening with a cover.

U.S. Pat. No. 3,206,892 discloses several embodiments of a collapsible cold frame incorporating a collapsible transparent ballast tube filled with water and air to permit the passage of incident solar infrared radiations, so that the ground under the ballast tube becomes heated by the rays of the sun, and the water also traps long wave infrared heat radiations which tend to pass out of the earth during the colder portions of the day and the night, thereby maintaining a more even temperature for the earth under the ballast tube and within the cold frame. In one embodiment of the cold frame, a removable covering member is supported by collapsible curved, arcuate or V-shaped ribs secured to spaced ballast tubes.

U.S. Pat. No. 3,939,607 discloses a collapsible terrarium assembly which is inflatable to assume a desired configuration for transparently housing a potted plant. The structure includes a disk-like base and a dome formed by an open, flexible plastic envelope whose rim is secured to a coupling ring which is joinable to the base to form a hermetically-sealed enclosure which can be inflated through a valve.

U.S. Pat. No. 4,304,068 discloses a collapsible terrarium that includes a flexible fluid-impermeable enclosure which has a bottom portion and a top portion that includes a collapsible support structure resembling that of an umbrella frame.

Other protective covers for plants are disclosed in U.S. Pat. No. 4,347,685 and U.S. Pat. No. 4,290,242.

Collapsible covers for plants heretofore devised do not provide sufficient thermal insulating capability in a free-standing structure which can be quickly and easily erected for temporarily protecting tender plants.

Accordingly there is a need for a portable greenhouse that is easy to install, occupies minimal space, and is relatively inexpensive.

SUMMARY OF INVENTION

The present invention relates to an inflatable self-supporting greenhouse used to protect plants from freezing temperatures and excessively dry periods. Constructed of an impermeable flexible material, the greenhouse consists of a plurality of inflatable tubular rings joined together to form a cylindrical shaped protective structure. The upper tubular rings have an interconnecting passageway which allows all the upper rings to be inflated using a single inlet. In addition, the upper rings are transparent to allow sunlight to pass through the cover to promote photosynthesis in the vegetation enclosed in the greenhouse and to allow the sun to heat the air inside the greenhouse. The lower ring, which is isolated from the upper rings, has a second inlet to allow a heavy medium such as water to be injected to create a stabilizing ballast at the base of the protective structure. The lower ring is opaque and, preferably, a dark color to provide a heat sink which can provide a source of heat during overcast periods. When fully inflated, the tubular rings have sufficient stiffness to provide the supporting framework of the greenhouse. In addition to providing the supporting structure of the greenhouse, the transparent tubular rings create a greenhouse effect by providing an insulating layer of air between the outside surface of the greenhouse and the inside surface of the greenhouse where infrared rays of sun warm the air inside the structure.

BRIEF DESCRIPTION OF THE DRAWING

Drawings of a preferred embodiment of the invention are annexed hereto so that the invention may be better and more fully understood, in which.

Other objects and advantages of the invention will become apparent upon reading the following detailed description and upon reference to the drawings, in which like reference characters are used throughout the drawings to designate like parts.

DESCRIPTION OF THE PREFERRED EMBODIMENTS

Figure 1:
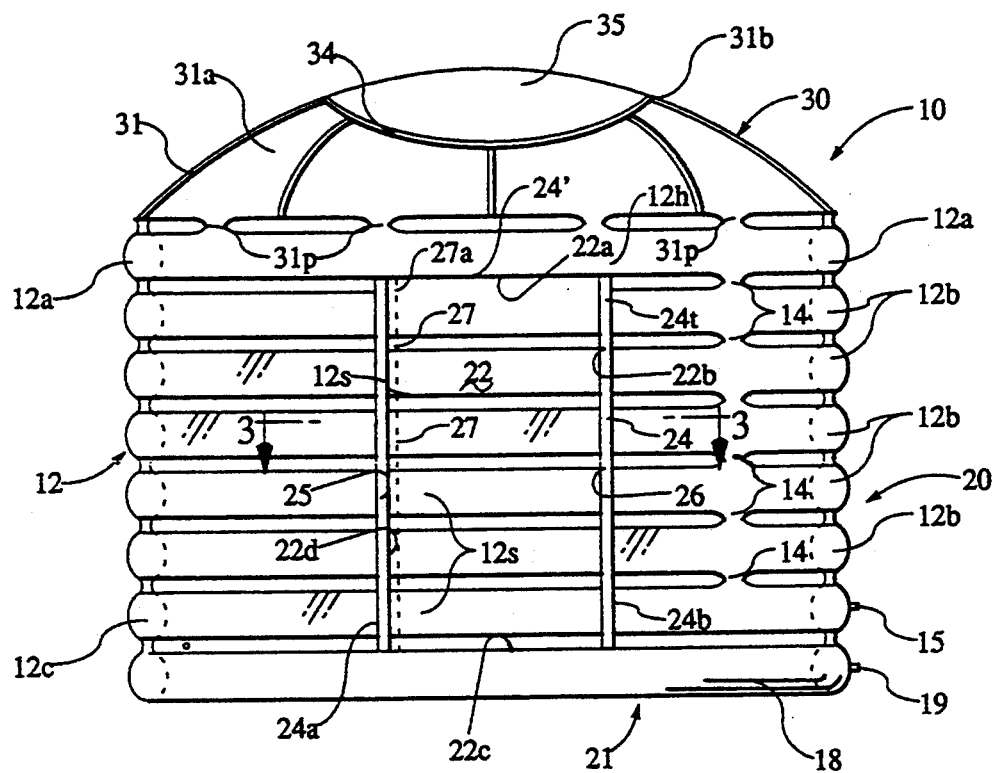
FIG. 1 is a front elevational view of the portable greenhouse according to the present invention.

Referring to FIG. 1, the numeral 10 generally designates an inflatable self-supporting greenhouse. The greenhouse 10 comprises a plurality of transparent inflatable plastic tubular rings 12 connected together to form a cylindrical wall 20, a cover 30 positioned over the wall 20, and a base 21.

Figure 4:
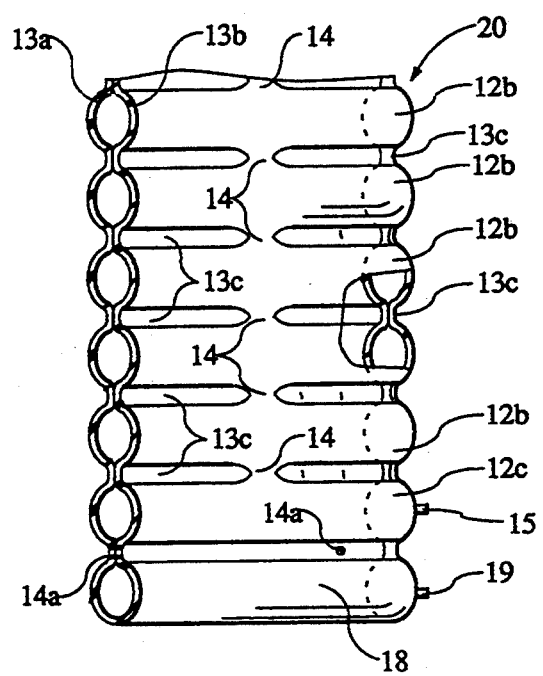
FIG. 4 is a cross-sectional view taken along line 4—4 of FIG. 2.

Referring to FIG. 4, the cylindrical wall 20 is preferably fabricated by heat sealing portions of spaced sheets 13a and 13b of plastic material to form spaced seams 13c which are discontinuous leaving unsealed portions 14 to permit free flow of air or other fluid between adjacent tubular rings 12. Openings 14a may be formed in seams 13c, for connecting tie-downs, flooring or other structures to the wall 20.

It should be readily apparent that air passages 14, if sufficiently wide, may form vertical inflated columns at one or more locations around the cylindrical wall 20.

As best illustrated in FIG. 15, transparent tubular rings 12 include an interconnecting air passageway 14 which allows all the transparent tubular rings 12 to be inflated with air through a single inlet 15 which preferably includes a valve stem and valve, such as a check valve or a Schrader valve of the type used for inflating vehicle tires and tubes.

Base 21 comprises an opaque inflatable ring 18 which is connected to lowest transparent ring 12c. Opaque tubular ring 18 includes an inlet 19 which also includes a valve to permit filling opaque ring 18 with a dense liquid medium, such as water. Preferably inlet 19 includes a threaded nozzle to permit hookup to a standard garden hose. By filling ring 18 with a dense medium the center of gravity of the structure 10 is shifted toward the ground thereby creating a ballast which in turn provides stability to structure 10.

As best illustrated in FIG. 1, each of the transparent tubular rings 12 communicates with the other transparent tubular rings 12 through common passageway 14 which extends through transparent tubular rings 12. Upper transparent tubular rings 12a form a continuous cylindrical wall section and act as a header 12h for a doorway 24 and a door 22 which are provided in container wall 20. Central tubular rings 12b are not continuous but instead terminate and have sealed ends 12e. Additionally, central tubular rings 12b are severed from upper rings 12a and base ring 18 over a discrete section to form door 22 having sides 22a, 22b, 22c, and 22d and opening 24 having vertical sides 25 and 26.

Figure 3:
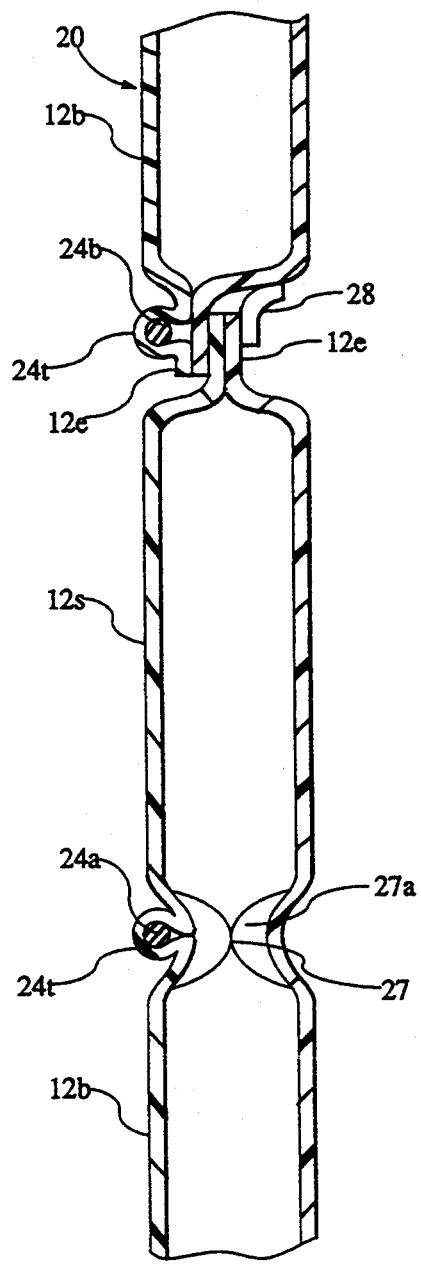
FIG. 3 is a cross-sectional view taken along line 3—3 in FIG. 1.

The door 22 is formed by a plurality of tubular sections 12s which are sealed on door sides 22a, 22b, and 22c and tack sealed on door side 22d to provide a hinge mechanism 27 and interconnecting passageways 27a, best illustrated in FIG. 3 of the drawing. Tubular sections 12s are in communication with adjacent central tubular rings 12b and upper tubular rings 12a via interconnecting passageways 27a so that when transparent tubular rings 12 are inflated, tubular sections 12s will also be inflated.

Opening 24 is framed by a pair of vertical support members 24a and 24b formed of rigid plastic, wood metal rods or other suitable rigid material to provide a doorway. Vertical support members 24a and 24b are captured by vinyl loops or tubes 24t which are bonded or welded to vertical sides 25 and 26 of the doorway 24. Tubes 24t are preferably of lightweight construction but strong enough to capture vertical support members 24a and 24b. Vertical members 24a and 24b are provided to prevent the central tubular rings 12b from deflecting outward at the discontinuity formed by the doorway 24 and to provide rigidity to the doorway 24. In the illustrated embodiment, tubes 24t are integrally formed by heat sealing portions of one of the sheets 13a or 13b.

Velcro strips 28 are provided along door side 22b to latch door 22 to doorway frame 24. Other suitable connecting means such as snaps, tie straps, hook & eye or lace can be used in lieu of the Velcro strips 28.

Figure 2:
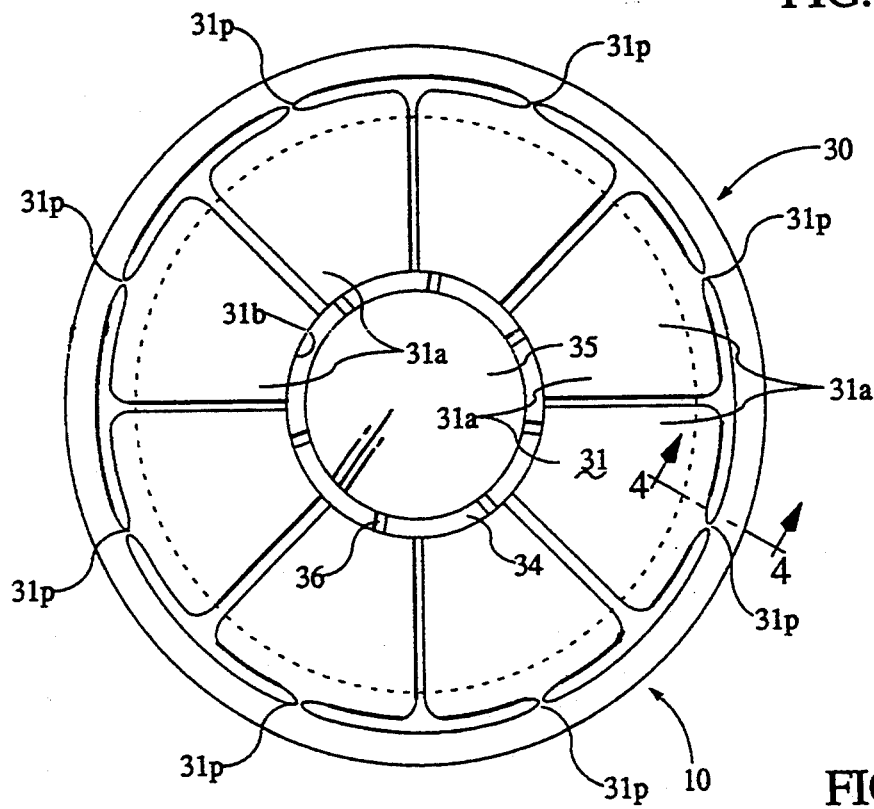
FIG. 2 is a top plan view.

As best illustrated in FIG. 2, an integral cover 30 is provided which comprises a plurality of inflatable, transparent radial segments 31a aligned with each other to form an annular shaped top 31. Opening 34 is centrally located in top 31 over which a transparent hatch 35 is positioned. Inflatable tubular rings 12 are connected to top 31 and provide support for top 31. In addition, transparent inflatable rings 12 have an interconnecting air passageway 31p with radial segments 31a so that radial segments 31a are inflated along with tubular rings 12 via common inlet 15. Hatch 35 is preferably formed by spaced circular sheets of plastic, heat sealed around their peripheries, and provided with a valve stem. Hatch 35 is attached to the inner perimeter 31b of annular top 31 using Velcro strips 36 or other suitable connector means. The hatch 35 is removable for ventilation of the plants through opening 34.

For quick assembly and disassembly first inlet 15, which is provided in the lowest tubular ring 12c of container 20, inflates or deflates cover 30 along with tubular rings 12 and tubular ring sections 12s.

Base 21 comprises at least one opaque inflatable plastic ring 18 and an inlet 19 for inflating ring 18 with water or other heavy mediums to provide stability to cylinder 20. Opaque ring 18 preferably is formed from plastic material having a dark color and is attached to the base of the cylindrical wall 20 at lowest transparent tubular ring 12c. It will be understood that the dark color of ring 18 allows opaque ring 18 to act as a heat sink during daylight, absorbing the sun's thermal energy, and to act as a heat source during the night or during overcast periods.

It should be readily apparent that the number and size of transparent tubular rings 12 can be varied as needed and depends on the size and number of the plants to be protected. Likewise, the number of opaque tubular rings 18 can also be varied to provide more or less ballast depending on the height and diameter of the greenhouse.

It should be appreciated that if it is deemed expedient to do so, tubular rings may be continuous to eliminate the door 22 and doorway for an enclosure that is elevated to enclose plants or into which plants are positioned through the opening 34 in the cover 30.

It will be understood, therefore, that although the invention has been described with particular reference to specific embodiments thereof, the invention is not so limited. The forms of the invention shown and described in detail are to be taken as preferred embodiments. Various changes and modifications may be resorted to without departing from the spirit and scope of the invention as defined by the appended claims.

The invention having been described, what is claimed is:

1. A portable self-supporting greenhouse comprising:
    (a) a plurality of transparent inflatable tubular rings forming a cylindrical wall having inside and outside surfaces defining an enclosure, said transparent rings having an inlet and interconnecting passageways which allow all of said transparent rings to be inflated with air via said inlet to form a self-supporting structure with an insulating layer of air between said inside and outside surfaces;
    (b) a means for providing a ballast for said enclosure;
    (c) a means for covering said enclosure having a means for ventilation; and
    (d) rigid doorway means formed in said enclosure.

2. A portable self-supporting greenhouse according to claim 1 wherein said means for covering said enclosure comprises:
    (a) an inflatable annular top in air communication with said transparent inflatable tubular rings, said annular top having a centrally located opening; and (b) a hatch positioned over said opening and removably secured to said annular top.

3. A portable self-supporting greenhouse according to claim 1 wherein said means for providing ballast to said enclosure includes an isolated lowermost inflatable tubular ring having a second inlet for delivering a heavy medium to said lowermost inflatable tubular ring.

4. A portable self-supporting greenhouse according to claim 3 wherein said lowermost inflatable tubular ring is opaque.

5. A portable self-supporting greenhouse according to claim 1 wherein said rigid doorway means comprises:
   a door formed by transparent tubular ring sections in air communication with said transparent tubular rings, said door having a hinge and a means for latching said door in a closed position in said doorway.

6. A portable self-supporting greenhouse comprising:
   (a) a plurality of transparent inflatable tubular rings forming a cylindrically-shaped structure, said tubular rings having a first inlet for inflating said transparent tubular rings and interconnecting passageways which allows all of said transparent rings to be inflated via said first inlet to provide an insulating layer of air in said tubular rings;
   (b) at least one opaque inflatable tubular ring attached to said transparent inflatable rings forming a base for said structure, said opaque ring having a second inlet for inflating said opaque ring with a dense medium;
   (c) a transparent cover for said cylindrical structure; and
   (d) a rigid doorway formed in said cylindrical structure.

7. A portable self-supporting greenhouse according to claim 6, wherein said cover includes:
   (a) a plurality of transparent inflatable radial segments defining an annular top which is in communication with said transparent rings, said annular top having an opening; and
   (b) transparent hatch positioned over said opening and removably secured to said annular top.

8. A portable self-supporting greenhouse according to claim 6, said rigid doorway comprising:
   (a) a doorway provided in said cylindrical structure, said doorway having two vertical sides, a header and a footer;
   (b) a door positioned in said doorway comprising a plurality of inflatable tubular sections having an interface with said transparent tubular rings forming the cylindrical structure and said tubular sections having a means for communicating with said transparent tubular rings such that said tubular sections inflate with said transparent tubular rings;
   (c) a door hinge formed in said interface; and
   (d) a latch means to secure said door in a closed position in said doorway.

9. A portable self-supporting greenhouse according to claim 8, wherein said doorway vertical sides includes a pair of vertical rigid members captured in said vertical sides for providing stiffness to said doorway.

10. A portable self-supporting greenhouse according to claim 9, said doorway vertical sides comprising tubular columns through which said rigid members extend.

11. A portable self-supporting greenhouse according to claim 8, said door hinge including intermittent welds extending along said interface between said door and said transparent tubular rings having intermittent passageways extending between said intermittent welds to allow said tubular sections to be inflated along with said transparent tubular rings.

12. A portable self-supporting greenhouse according to claim 6, said transparent cover comprising:
   (a) a plurality of transparent inflatable radial segments defining an annular top which is in communication with said transparent rings, said annular top having an opening; and
   (b) an inflatable transparent hatch positioned over said opening and removably secured to said annular top.

* * * * *